INVENTOR
DELMAR O. SEEVERS
BY
ATTORNEYS

INVENTOR
DELMAR O. SEEVERS
BY P.E. Johnston
Ralph L. Freeland
ATTORNEYS

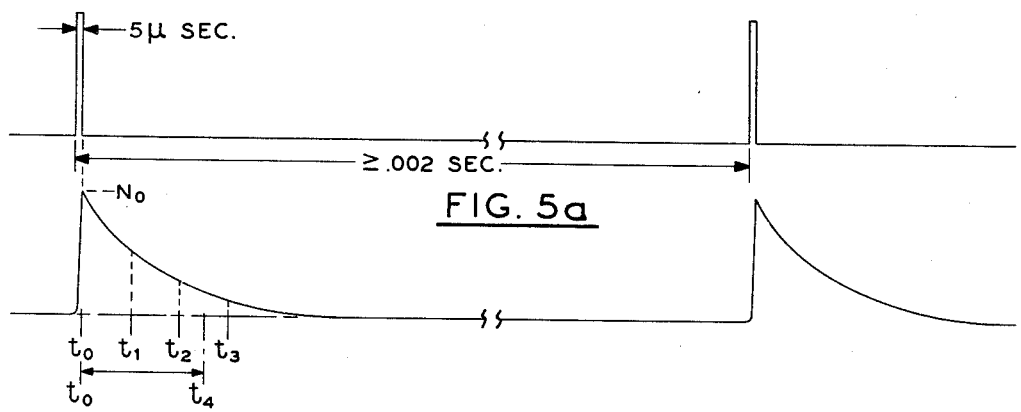
FIG. 5a
FIG. 5b
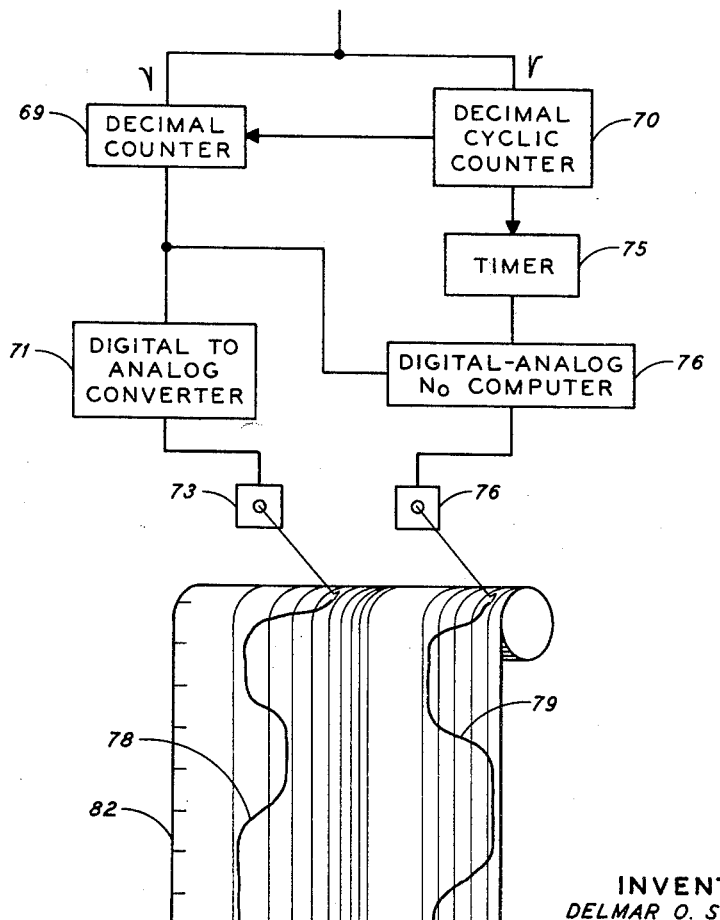
FIG. 6
INVENTOR
DELMAR O. SEEVERS
BY
ATTORNEYS

United States Patent Office 3,508,052
Patented Apr. 21, 1970

3,508,052
NEUTRON ABSORPTION LOGGING WITH THERMAL NEUTRON-CAPTURE GAMMA RAYS HAVING ENERGIES OVER 2.2 MEV.
Delmar O. Seevers, Fullerton, Calif., assignor to Chevron Research Corporation, a corporation of Delaware
Continuation-in-part of application Ser. No. 183,997, Mar. 27, 1962. This application Dec. 18, 1964, Ser. No. 422,065
Int. Cl. G01t *1/20, 1/16;* H01j *39/00*
U.S. Cl. 250—71.5   11 Claims

ABSTRACT OF THE DISCLOSURE

The invention is directed to a method of identifying oil and water interfaces behind a steel casing in a well bore by pulsing a fast neutron source and then after the source is off, detecting the rate of absorption of the neutrons that are thermalized by fluids within the well bore and the surrounding earth formations to generate thermal-neutron-capture gamma rays in chlorine nuclei and detecting only gamma rays having energies above about 2.2 mev. It has been discovered that even if neutron-capture-gamma rays are detected only after all neutrons are thermalized, such gamma rays from hydrogen in the borehole and formation fluids obscure the detection of chlorine, because thermal neutrons cannot be directed out of the borehole; thus, they are more likely to interact with available hydrogen nuclei in the well bore, even when fully thermalized. By using gamma rays with energies above 2.2 mev. the detection of salt is made insensitive to capture gamma rays generated by hydrogen nuclei in the well bore, or in salt water or oil in the formation. The rate of decay of thermal neutrons is then measured by recording the total number of gamma rays detected in two different counting periods after the neutron source is cut off.

In one embodiment the total number of hydrogen nuclei (indicative of total fluid content) is determined from the measured rate of decay of only the higher energy thermal-neutron-capture-gamma rays by establishing the total neutron flux at the time the neutron source is turned off.

---

The present invention relates to nuclear well logging methods. More particularly, it relates to a method of measuring the thermal neutron absorption characteristic of an earth formation, including its fluid content. In this method, a fast neutron source is positioned in a well bore and is periodically energized to irradiate the surrounding formation. Then, at the end of each neutron-emission cycle, the rate that the moderated, or thermal, neutrons are absorbed by the formation is measured by recording the rate that thermal-neutron-capture gamma rays return to the well bore.

The present application is a continuation-in-part of my application Ser. No. 183,997, filed Mar. 27, 1962, now abandoned. Said application 183,996 is a continuation-in-part of my application Ser. No. 39,396, filed June 28, 1960, now abandoned, which in turn is a continuation-in-part of my application Ser. No. 567,014, filed Feb. 21, 1956, now abandoned.

It is an object of the present invention to teach a method of measuring the linear macroscopic coefficient for thermal neutron absorption by an unknown material, such as an earth formation, including its fluids, by determining the mean life of thermal neutrons in such material. To determine this mean life of thermal neutrons, a source of fast neutrons is cyclically energized to emit neutrons into an earth formation for a predeterminable time interval. Neutron irradiation of the formation is then interrupted. Certain gamma rays generated by capture of thermal neutrons within the formation are then detected and counted over a time interval of known length. Gamma rays are also counted for another time interval of known length. The logarithmic ratio of the counting rates in these two intervals is proportional to the coefficient of absorption of the earth formation.

Neutron methods used in well logging to detect fluids in earth formations along the well bore are usually more sensitive to fluids in the well bore than they are to those in an earth formation. The reason that such previously known neutron logging techniques measure mainly well bore fluids is that fast neutrons slow down to thermal energy by a series of elastic collisions. (These collisions are also called scatter reactions.) Neutrons are slowed down most efficiently by collisions with hydrogen nuclei, protons, because they are nearly equal in mass. Each collision slows the neutron until it becomes thermal. In a well bore, the largest number of protons are in the borehole fluid, and they surround the source of neutrons. The thermal neutrons are then detected directly. Or, the gamma rays that result from thermal-neutron capture are detected. Thermal-neutron capture is also quite a probable reaction with hydrogen, but even more probable with other nuclei, such as chlorine. However, the hydrogen nuclei are closer and therefore more available in the well bore.

Since well bores almost always contain large amounts of hydrogen in liquids, water, or hydrocarbons, the borehole diameter has an important bearing on the neutron-neutron or neutron-gamma-ray logs recorded in it. This generally means that a caliper log of the hole must also be recorded, to compensate the instrument readings recorded in a neutron log. Also, neutron logs now in use assume that a fixed proportion of the nuclear particles return to the detector in the borehole. When neutrons are absorbed in the borehole and the surrounding earth formation, the proportionality is destroyed. Even so, this lack of proportionality was ignored, because the neutron absorption coefficient of an earth formation could be measured only by placing the neutron source on one side of the material and the detector of neutrons on the other side.

Obviously, this cannot be done where the detector is in a well bore and the material under study surrounds the borehole. Its unaccessibility is the very reason for an indirect study.

In a well cased with steel pipe, the iron nuclei in the pipe are between the logging tool and the earth formation. These nuclei also are in an ideal location to absorb thermal neutrons and further degrade the neutron log.

For a better understanding of how the present invention determines the coefficient of neutron absorption of an unknown material, independent of the environment around the source of neutrons, the theoretical basis for the measurement will now be explored.

If $i$ represents the number of kinds of nuclei having a capture cross section $\sigma_i(v)$ for neutrons of velocity $v$, and $n_i$ is the number per unit volume, the probability for capture of these nuclei per unit path is $\sigma_i n_i$, and the probability for capture per unit time $(\lambda_i)$ is $$\lambda_i = \sigma_i n_i v \qquad (1)$$

then the total capture probability is $$\lambda = \Sigma_i \lambda_i = \Sigma_i \sigma_i n_i v = \Sigma_a v \qquad (2)$$

where $\Sigma_a$ is the linear macroscopic absorption coefficient and the mean life, $\tau_a$, is $$\tau_a = \frac{1}{\lambda} = \frac{1}{\Sigma_a v} = \frac{4.55}{\Sigma_a} \text{ microseconds} \qquad (3)$$

where $v$ (thermal neutron velocity)=$2.2 \times 10^5$ cms./sec.

The density of thermal neutrons $n$ at any point obeys the equation $$\frac{dn}{dt} = -\frac{n}{\tau} + q + D\bar{V}^2 n \qquad (4)$$

where $dn/dt$ is the total change of density in time, $n/\tau$ is the loss by capture, $q$ is the gain by slowing down of fast neutrons, and $D\bar{V}^2 n$ is the change due to the diffusion current, wherein $D$ is the diffusion constant.

Where a given number of fast neutrons per second are continuously generated as in earlier methods of neutron logging, an equilibrium state is rapidly established (in a few microseconds). Thus the total change of density in time, $dn/dt$, becomes zero, and Equation 4 is $$n/\tau = q + D\bar{V}^2 n \qquad (5)$$

In conventional neutron-gamma logging, the rate of gamma rays detected, C, at some fixed distance from the source is proportional to the rate of capture of thermal neutrons in the borehole and formation adjacent to the detector, i.e., $$C\delta \int \frac{n}{\tau a} dv$$

where the integration is over an effective volume determined by the geometry and the absorption coefficent for neutron-capture gamma rays. It is generally assumed that the neutron absorption characteristics of the material in this effective volume remain constant (i.e., $\tau_a$ is a constant) all along the borehole, so that variations in C result only from variations in the neutron density $n$. One factor which determines the neutron density in this volume is the reflection coefficient for fast neutrons at the interface between the borehole and the formation. This reflection coefficient is largely a function of the hydrogen content of the formation. Thus the number of gamma rays detected is related to the porosity of the formation, with all the pores presumed to be filled with hydrogenous material, either oil or water. Another thing that strongly affects the neutron density at a fixed distance from the source is the geometry of the borehole and the location of the source and detector with respect to the axis of the borehole. A variation in any of the above-mentioned things will result in a change in counting rate of the detector. To obtain information on porosity from the log, corrections must be made for all the other effects that will influence the counting rate.

In accordance with the present invention, the neutron absorption coefficient, or characteristic, of an earth formation is measured substantially independent of the density of thermal neutrons in the well bore or formation. Thus, the measurement of said coefficient is made substantially independent of irregularities in the geometry of a well bore.

Consider again Equation 4. If this equation is integrated over the volume of earth formation exclusive of the borehole, one obtains $$\frac{dN}{dt} = -\frac{N}{\tau_a} + \frac{Q}{\tau_s} + I \qquad (6)$$

where N is the total number of thermal neutrons in the formation, Q is the total number of fast neutrons in the formation, and $\tau_a$ is the mean life of thermal neutrons, $\tau_s$ is the mean slowing-down time for the fast neutrons, and I is the net thermal-neutron diffusion current from the borehole into the formation. If the source of fast neutrons is suddenly turned off, it was found experimentally that the diffusion current term contributes a negligible amount to the rate of change of thermal neutrons in the formation, and the solution for Equation 6 is $$\frac{N}{\tau_a} + \frac{N_0}{\tau_a} \exp -t/\tau_a + \frac{Q_0}{\tau_a - \tau_s}(\exp -t/\tau_a - \exp -t/\tau_s) \qquad (7)$$

where $N_0$ is the number of thermal neutrons and $Q_0$ the number of fast neutrons in the formation at the instant the source is turned off ($t=0$). Since the intensities of neutron-capture gamma rays, $I_\gamma$, from the formation, as measured in the borehole, are then proportional to the rate of absorption of thermal neutrons, then $$I_\gamma = A\left[\frac{N_0}{\tau_a}\exp -t/\tau_a + \frac{Q_0 \tau}{\tau_a - \tau_s}(\exp -t/\tau_a - \exp -t/\tau_s)\right] \qquad (8)$$

where A is the proportionality constant between $I_\gamma$ and $N/\tau_a$. It was found experimentally that if there were an inch or more of drilling fluid between the sonde and the borehole, or an equivalent amount of moderator placed around the same in the sonde, and $I_\gamma$ is measured at a time long as compared to $\tau_s$, the effect of the slowing down of fast neutrons is made negligible, and $$I_\gamma = I_0 \exp -t/\tau_a = K \exp -t/\tau_a \qquad (9)$$

where K is a proportionality constant related to $I_0$, the gamma-ray intensity before the source is turned off.

In a preferred method of practicing the invention, a neutron source is placed adjacent an earth formation, and the source controlled to emit cyclically a flux of neutrons. When this flux is suddenly interrupted, at the end of each cycle, thermal neutrons are absorbed at the rate $N/\tau_a$; more specifically, the mean life, $\tau_a$, of the thermal neutrons in the formation, is measured as the decay constant of thermal-neutron-capture gamma rays generated in the formation. As seen by Equation 9, this decay constant is equal to $1/\tau_a$, the reciprocal of the mean life, $\tau_a$, of thermal neutrons.

So it can be seen from Equation 3 that the decay constant for thermal-neutron-capture gamma rays created in the formation, and which return to the well bore, is proportional to the thermal-neutron coefficient of absorption, $\Sigma_a$, for the material.

In a preferred method of carrying out the invention, the decay constant for thermal-neutron-capture gamma rays is measured by using only those gamma rays having energies of at least a predeterminable minimum value. That value is selected to be greater than the energy of gamma rays generated in hydrogen nuclei. Most of the gamma rays with energy greater than this minimum value are from the formation, even though the drilling fluid contains material other than water or oil. Additionally, the decay constant is then measured, counting these gamma rays over two different periods of time. The rate of counting in such two different periods in then converted to a ratio, and this ratio is recorded in accordance with the depth of the neutron source in the well bore. This recorded ratio is the neutron-absorption coefficient of the formation at a known depth.

The neutron-absorption coefficient may be converted to indicate directly the concentration of chlorine in the earth formation by suitable calibration of the recorder. Specifically, I have found that the counting ratios in the formation waters will be a function of the percentage of chlorine, with the chlorine content increasing as this ratio decreases.

Further objects and advantages of the present invention will become apparent from the accompanying drawings, which form an integral part of the present specification.

In the drawings:

FIG. 5a is a time-versus-fast-neutron-flux diagram for a short pulse or "burst" irradiation system of the type useful with apparatus illustrated in FIG. 4.

FIG. 5b is a time-versus-thermal-neutron-capture gamma-ray decay surve for a fast-neutron-burst system as indicated in FIG. 5a.

FIG. 6 is an alternative surface recording system useful to measure simultaneously thermal-neutron decay constant and conventional thermal-neutron intensity; it is useful with a fast neutron source and scintillation detector arrangement of the form shown in FIG. 1, and a downhole pulse control and counting system of the form shown in FIG. 4.

Figure 1:
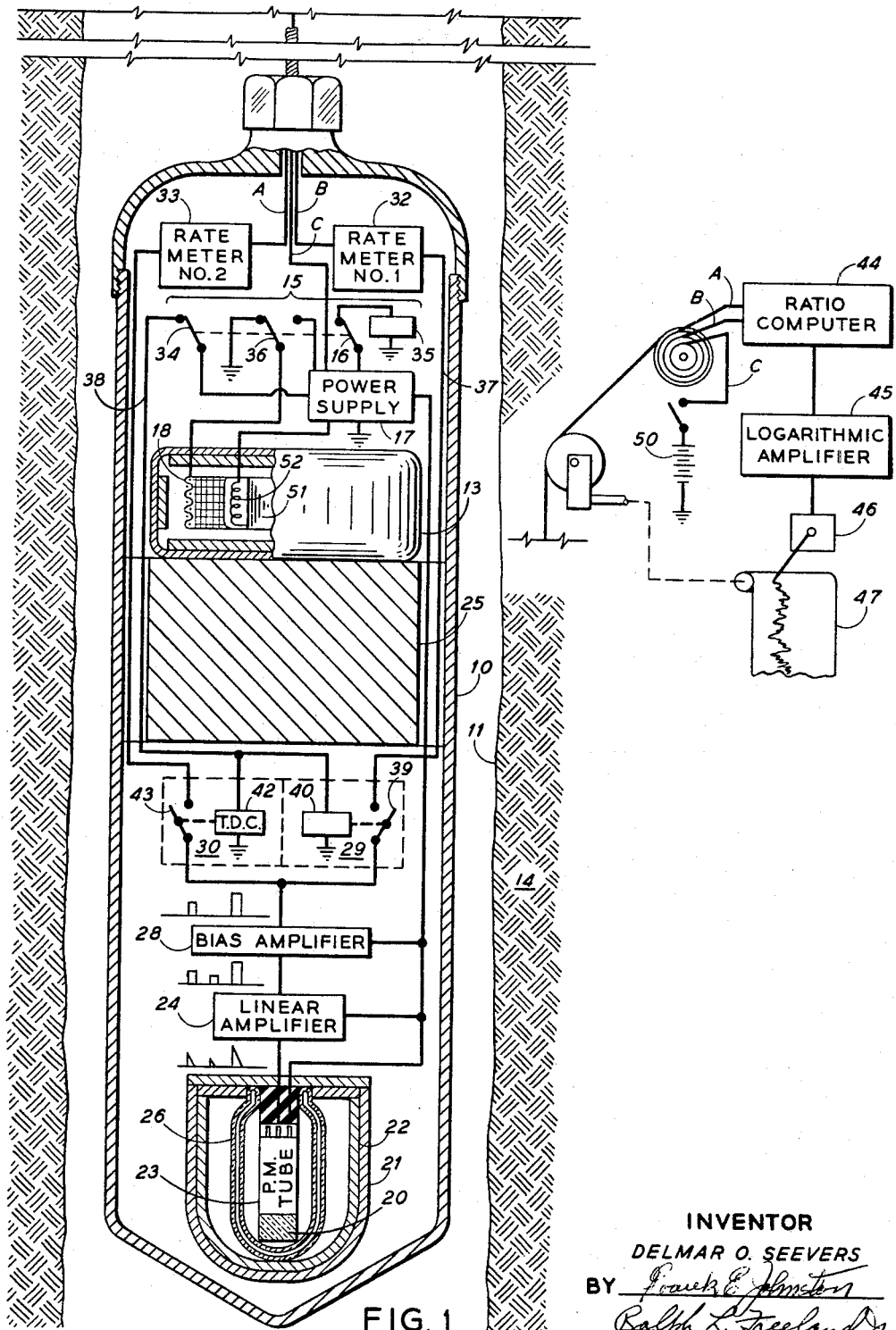
FIG. 1 illustrates a perferred form of apparatus to carry out the method of the present invention, when used for well logging in an open, or uncased, well bore; the neutron source and detector are adapted to traverse a well bore penetrating earth formations whose absorption coefficients for thermal neutrons are to be measured.

Referring now to the drawings, and in particular to FIG. 1, one form of apparatus suitable to carry out the method of the present invention is shown. Logging sonde 10 traverses well bore 11 on the lower end of logging cable 12. A neutron generator 13 of the accelerator type is positioned within logging sonde 10 to cyclically irradiate an earth formation, such as that identified generally as 14, through the walls of well bore 11. Neutron generator 13 is shown to be of the electronic control type of ion accelerator, wherein neutrons are generated by any suitable reaction process, such as the deuterium-tritium reaction. It will be understood that any suitable neutron generator may be used if it can be pulsed, or periodically turned on and off to irradiate cyclically the formations at a predeterminable frequency.

In the FIG. 1 arrangement, formation 14 is irradiated intermittently by control of accelerator 13 through relay or vibrator 15. As shown schematically, source 17 continuously energizes filament 51 and cathode 52 of generator 13. Electrons, and resulting ions, accelerate to grid plate 18 when contact 36 of vibrator 15 connects cathode 52 to source 17. Contact 16 cyclically or periodically energizes coil 35 of vibrator 15 to excite grid plate 18 at about 200 cycles per second (c.p.s.). Each time vibrator 35 opens its power supply line, contact 36 interrupts its connection to the source 17 and grounds grid plate 18. Thus, neutron source 13 is turned on for 1/200 of a second (5,000 microseconds) and off for a similar period. Obviously, time delays can vary the length of these periods to lengthen or shorten either the "on" or "off" parts of each cycle.

By pulsing neutrons into formation 14, its thermal-neutron-absorption coefficient can now be measured. As discussed above, this coefficient is a time-dependent variable. Specifically, it is the rate at which thermal neutrons disappear in the formation. This rate is measured as follows: Nuclei within formation 14 generate gamma rays instantaneously upon capture of thermal neutrons. But, at the same time, fast neutrons create gamma rays by inelastic scatter from other nuclei, such as oxygen or carbon nuclei. Thus, thermal-neutron-capture gamma rays are detected only after the neutron source irradiates the formation with fast neutrons for a predeterminable time; the source is then abruptly cut off. After the neutron flux decreases, gamma rays return from the formation at a decreasing rate that depends upon the thermal-neutron-absorption coefficient. It is then these decreasing numbers of gamma rays that are detected in scintillation crystal 20. As will be explained below, crystal 20 is suitably spaced from source 13. The spacing in part depends upon the material from which the crystal is formed. If crystal 20 is sodium iodide-thallium activated, it is positioned behind shields 21 and 22. Shield 21 is selected to absorb low-energy gamma rays. While the number of gamma rays from hydrogen entering crystal 20 can be reduced in this way, desirably the minimum energy of gamma rays recorded is finally set by amplifier 24. Shield 22, preferably a boron compound, absorbs thermal neutrons diffused back into the well bore, so that the detector crystal will not become radioactive. Shield 21, as well as 25, is desirably bismuth. Bismuth nuclei primarily generate only low-energy neutron-capture gamma rays that can be eliminated electrically from the final detection and measurement.

As further shown in FIG. 1, photomultiplier tube 23 and linear amplifier 24 convert the light impulses generated by gamma rays in scintillation crystal 20 to electrical pulses. The size of each electrical pulse is related to the energy of the gamma rays detected in crystal 20. Dewar flask 26 thermally insulates scintillation detector 19 from high temperatures in the well bore. As indicated, detector 19 includes both photomultiplier tube 23 and crystal 20.

At this point, it is important to note in FIG. 1 that well bore 11 is not lined with a steel casing and no fluid fills the hole. It is so illustrated because the present method can be used under any combination of these conditions. However, its greatest utility is believed to be in an oil well like that shown in FIG. 4 where the bore is cased with steel pipe bound to the earth formations with portland cement and the well filled with oil or water. As will be explained below, these materials do not hinder measurements of an earth formation's thermal-neutron-absorption coefficient. In fact, they help one to measure these values because the hydrogen nuclei in the fluid and cement moderate many of the fast neutrons before they enter the formation. However, even if there is no liquid (even drilling fluid) in the borehole, hydrogen nuclei in the formation, such as those bound in shales as well as those in free fluids, will slow the neutrons to thermal energies. It is important to eliminate these interactions between neutrons and hydrogen from the measured gamma-ray reaction. Thus, to measure the neutron-absorption coefficient of earth formations along the well bore, all gamma rays of less energy than about 2.2 mev., the thermal-neutron-capture gamma-ray energy of hydrogen, are eliminated. Bias amplifier 28, connected between linear amplifier 24 and the electronic gates 29 and 30, sets this energy threshold. To explain more easily what gates 29 and 30 do, these units are shown as simple mechanical relays 40 and 42. In practice, relays 40 and 42 are too slow due to their mechanical inertia, and their functions are performed better by electronic circuits. In FIG. 1, gates 29 and 30 alternately connect bias amplifier 28 to rate meters 32 and 33, respectively. Gates 29 and 30 and rate meters 32 and 33 are synchronized with the off-time for neutron generator 13 so that they are only connected to gamma-ray detector 19 when formation 14 is not being irradiated with fast neutrons. Contact 34 of vibrator 15 energizes relays 40 and 42, respectively, to close gates 29 and 30. Thus, vibrator relay 15 starts the two counting periods to measure the gamma-ray rate of decay, because gates 29 and 30 control these counting periods. As indicated schematically, gate 29 closes immediately after contact 36 grounds grid plate 18 of generator 13. At the same time, contact 34 connects source 17 to relay 40, and its contact 39 connects bias amplifier 28 to rate meter 32. As will be explained below, relay 40 preferably remains closed during all of the "off" time for neutron generator 13. But it may be adjusted to stay closed for as little as approximately 100 microseconds.

This establishes a first counting period to measure gamma-ray decay rate. When gate 29 has been closed for such a predetermined time interval, gate 30 then closes to connect also bias amplifier 28 to rate meter 33. As indicated, relay 42 is preferably of the time delay closing (TDC) type. It will close only after a given lapse of time; in the present case that lapse is 100 microseconds. After this time interval in each cycle of neutron radiation, contact 43 connects bias amplifier 28 to rate meter number 2, identified as 33.

To record the neutron-absorption coefficient at the earth's surface, leads A and B connect rate meters 32 and 33 to ratio computer 44 and logarithmic amplifier 45. The purpose of log amplifier 45 will be explained more fully below. The output of amplifier 45 is an electrical signal variable in accordance with changes in the thermal-neutron-absorption coefficient of formation 14. Galvanometer 46 records this signal on chart 47. The logging cable drives chart 47 through a mechanical link to indicate the depth of sonde 10 in the well bore.

Figure 2A:
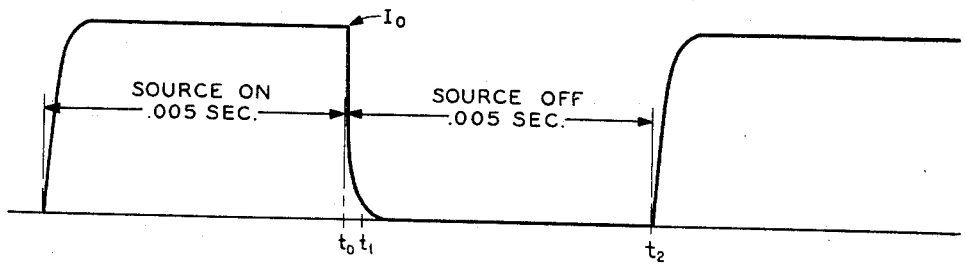
FIGS. 2a and 2b are time-versus-gamma-ray-intensity diagrams useful in explaining the time intervals used, respectively, to irradiate an earth formation with neutrons and then to measure thermal-neutron-capture gamma-ray decay constant for that formation.
Figure 2B:
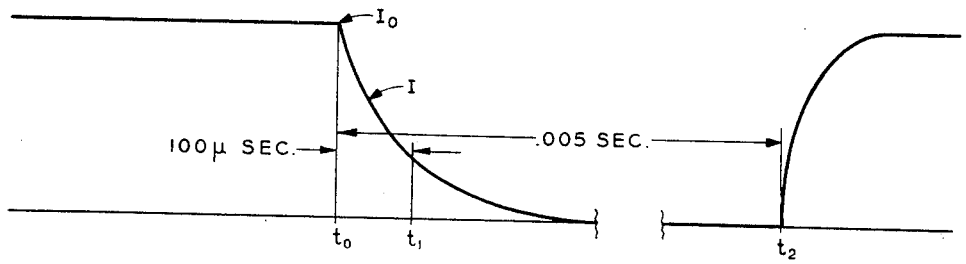

FIGS. 2a and 2b illustrate one form of time-versus-thermal-neutron-capture gamma-ray intensity curves produced during each "on-off" cycle of neutron generator 13, as referred to above. Desirably, each half-cycle is relatively long in duration (FIG. 2a) as compared with the actual measuring periods (FIG. 2b) used in carrying out the present method. Conveniently, the "on-and-off" time periods for neutron source 13 may be about 50 times longer than the vital portion of each measuring period. For example, the radiation time as shown in FIG. 2a may be about .005 second (5,000 microseconds). Thus, the lengths of the two counting periods are adjusted so that the first period starts as soon as the neutron source is cut off and continues over the entire 5,000-microsecond "off" period. The second counting period starts 100 microseconds later and extends over the remainder of the "off" time.

The time intervals for $t_0$, $t_1$, and $t_2$ as illustrated in FIG. 2a are expanded in FIG. 2b to show better the relationship of counting rates to time. It will be seen in FIG. 2b that the number of counts per unit time, I, recorded during the period of time $t_0$ to $t_2$, is substantially greater than that observed during the time interval from $t_1$ to $t_2$. In accordance with this invention, the ratio of these two counting rates measures the thermal-neutron-absorption coefficient of formation 14. As mentioned above, neither counting period includes gamma rays generated while the neutron source is irradiating the formation, because fast neutrons produce gamma rays similar in energy by an inelastic scattering. Primarily oxygen nuclei in water, and most rocks, and carbon in oil, and carbonate rocks, produce such inelastic-scatter gamma rays. These gamma rays are not related to the thermal-neutron-absorption coefficient of the formation and only confuse the record, because they are of about the same energy as those that must be recorded.

As shown above, experimental measurements of the intensities of thermal-neutron-capture gamma rays from the earth formation may be expressed as in Equation 9 by the general formula $$I = K \exp{-t/\tau_a} \quad (10)$$

where

I = intensity of detected gamma rays generated by thermal-neutron absorption
K = a proportionality constant related to $I_0$ and $\tau_a$ = the mean life of the thermal neutrons in the formation Let $N_1$ = number of gamma rays detected in the interval from $t=t_0$ to $t=t_2$, and $N_2$ = number of gamma rays detected between $t=t_1$ and $t=t_2$.

Then, $$N_1 = \int_{t_0}^{t_2} K \exp{-t/\tau_a} dt = K\tau_a(\exp{-t_0/\tau_a} - \exp{-t_2/\tau_a}) \quad (11)$$

and $$N_2 = \int_{t_1}^{t_2} K \exp{-t/\tau_a} dt = -K\tau_a(\exp{-t_1/\tau_a} - \exp{-t_2/\tau_a}) \quad (12)$$

if:

$t_0 = 0$
$t_1 = $ const
$t_2 = \infty$ (for practical purposes, where $t_2 > 2.5\tau_a$)
$N_1 = K\tau_a$
$N_2 = K\tau_2 \exp{-\text{const}/\tau_a}$ and $$N_1/N_2 = \exp{-\text{const}/\tau_a} \quad (13)$$

Since $$1/\tau_a = \Sigma_a v \quad (14)$$

where $\Sigma_a$ = coefficient of thermal-neutron absorption of the irradiated material and $v$ = thermal-neutron velocity $$\ln \frac{N_1}{N_2} = \text{const } \Sigma_a v \quad (15)$$

Where the time $t_1$ is substantially constant, say 100 microseconds, as in the embodiment of FIG. 1, and the thermal-neutron velocity is also a constant for a given formation temperature, the neutron-absorption coefficient is thus a logarithmic function of the ratio of gamma rays detected during the counting periods. Since the number of gamma rays detected in each counting period will in general be very small, it is necessary to repeat the "on-off" cycle many times and sum the counts $N_1$ and $N_2$ over a period of time long enough to be sure of good statistical accuracy. This is done in the embodiment of FIG. 1 by repeating the cycle 200 times a second and integrating the counts in rate meters 32 and 33. These rate meters require a time constant of a few seconds. Thus the output current of each rate meter is proportional to the number of gamma rays detected in one of the two selected time intervals averaged over many cycles. The ratio of these two currents will be proportional to exp const/$\tau_a$. This is the slope of the decay curve shown in FIG. 2b. Thus logarithmic amplifier 45 provides an electrical signal to recording oscillograph 46 that varies in magnitude with the coefficient of thermal neutron absorption of the sample, such as formation 14. Changes in this coefficient of thermal neutron absorption cause changes in the slope of the decay curve that are effectively measured and recorded. However, this decay rate for thermal neutrons remains substantially constant for a material unaltered during measurement, such as an earth formation that is being logged.

By recording changes in the ratios of the two counting rates in accordance with the method of this invention, the chlorine content of an earth formation may be directly deduced. This is especially true where the general sedimentary character of the formations along the well bore is known. As an example, the linear absorption coefficient, $\Sigma_a$, was measured for a sand having 34% porosity with the pores filled with fresh water and with salt water containing 6.5% NaCl by weight. The results were as follows:

(1) Fresh water, $\Sigma_a = 0.0146$ cm.$^{-1}$
(2) 6.5% salt water, $\Sigma_a = 0.0203$ cm.$^{-1}$ Earlier workers in neutron logging were not able to measure the chlorine content of earth formations by detecting neutron-capture gamma rays, or thermal neutrons, while a source continuously generates fast neutrons. In particular, reference is made to the work of Tittle et al. on neutron logging, as recorded at page 266 in "Geophysics," vol. 16, 1951. Tittle et al. observed virtually no distinction between fresh water and water containing salt in relatively great concentrations. However, in those tests a neutron source continuously irradiated the material.

Figure 3:
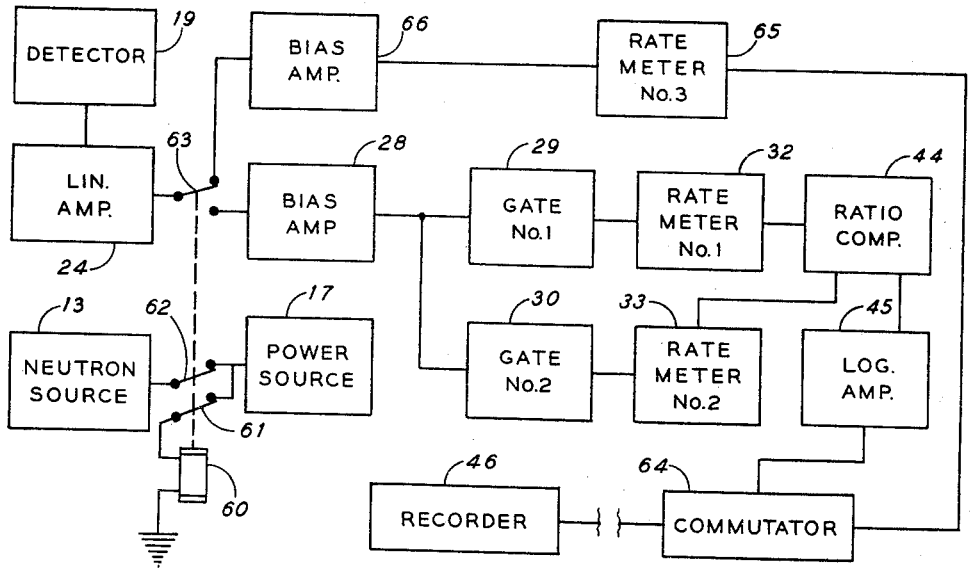
FIG. 3 is an alternative form of apparatus in accordance with the invention. It is useful to record simultaneously the thermal-neutron-absorption coefficient and conventional neutron-gamma information for the sample under investigation.

FIG. 3 illustrates an arrangement to measure and record a conventional neutron-gamma-ray log while simultaneously cycling a neutron source. To do this, the "on" portion of each cycle is used. Thus one can not only measure the neutron-absorption coefficient, by detecting the decay constant for gamma radiation when the neutron source is cut off, but also measure thermal-neutron density, as defined above, to record a conventional neutron-gamma log. As discussed before, thermal-neutron density increases when fast neutrons collide with hydrogen nuclei. This density is primarily interpreted as a measure of the amount of hydrogen in fluids around the borehole. By combining the neutron-absorption coefficient and neutron density, one can more completely diagnose an earth formation. In this method, source 13 is vertically spaced from detector 19 about the same distance as in conventional neutron-neutron or neutron-gamma-ray logging. This is normally about 12 to 24 inches. As is well understood in the art, this spacing controls both the amplitude and whether the signal increases or decreases with variations in fluid content of a formation. At about 8 inches there is little change in signal amplitude. At less than 8 inches, the direction, or sign, of the signal variations is reversed from conventional commercial practice. That is, an increase in fluid content decreases the signal amplitude, because few neutrons or gamma rays are detected.

In FIG. 3 apparatus it will be seen that during each "on" cycle for source 13, contact 63 of relay 60 connects gamma ray detector 19 annd linear amplifier 24 to another rate meter, identified at 65. Rate meter 65 is in turn connected to surface recorder 46 through commutator 64. In this way rate meter 65 counts all gamma rays absorbed by detector 19 during the "on" portion of each "on-off" cycle of source 13. However, because this curve is intended to respond to hydrogen interactions, bias amplifier 66 is set to count gamma rays within the hydrogen photo peak energy. Desirably it will count those nuclear events that have a minimum energy of about 1 mev., but the bias may be set at even a lower energy. The rest of the circuits shown in FIG. 3 operate in the same way as those shown in FIG. 1; neutron source "off" position for contact 63, of relay 60 connects detector 19 and linear amplifier 24 to bias amplifier 28. Its bias will be set at an energy above about 2 mev. to operate the recording circuits in the same way as those described in FIG. 1. Thus, the thermal-neutron decay rate is measured by the ratio of the outputs of rate meters 32 and 33. The two separate logs are then printed by recorder 47, as follows: Commutator 64 in sonde 10 alternately connects recorder 47 to the output of rate meter 65 and the electrical signal that represents the ratio of the outputs of rate meters 32 annd 33. This ratio signal is the output of log amplifier 45. In FIG. 3, ratio computer 44 and amplifier 45 are shown in the logging sonde. Most of the electrical components shown in FIGS. 1 and 3 can be located at the earth's surface, if a logging cable with good high-frequency transmission characteristics is used.

Figure 4:
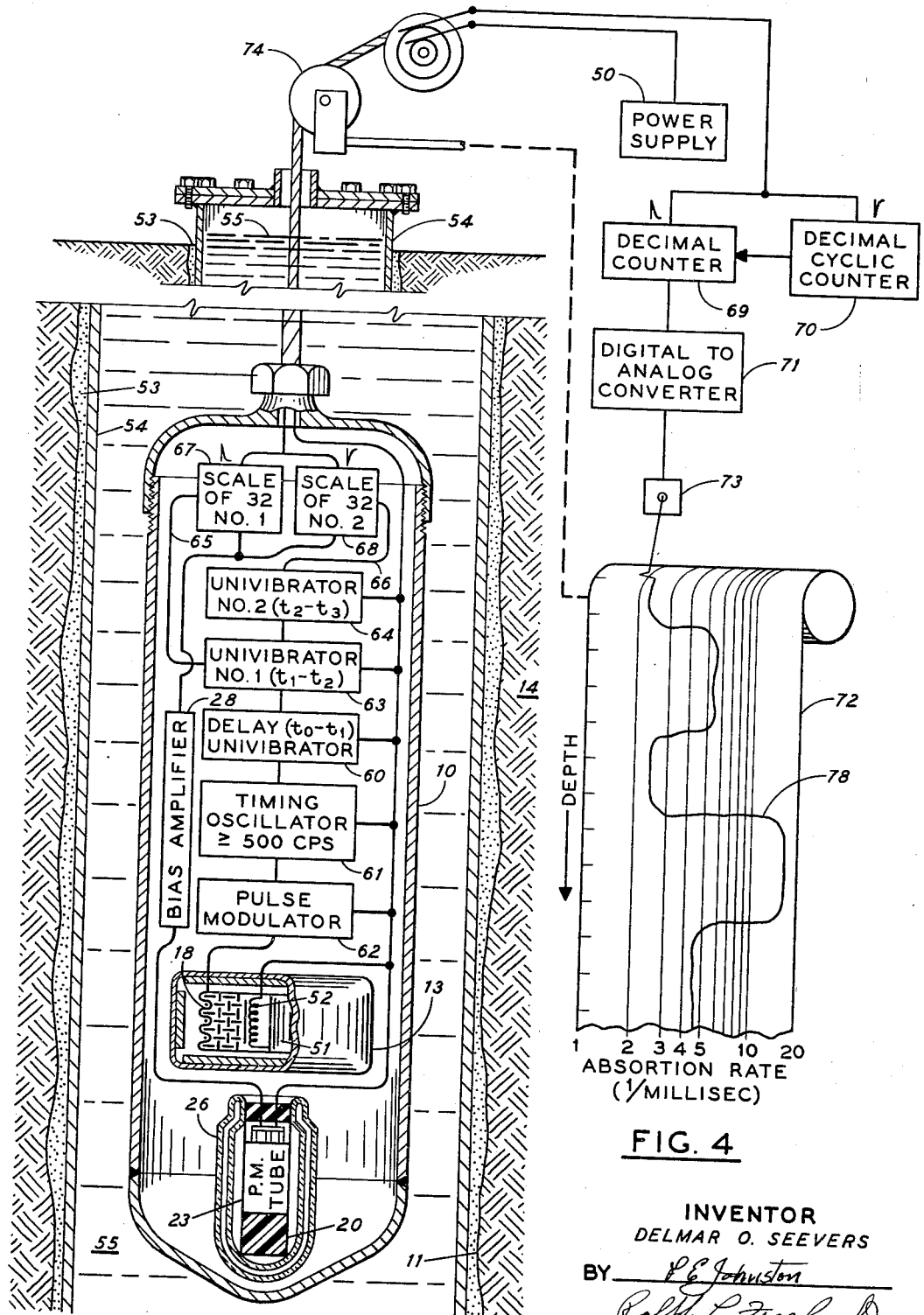
FIG. 4 is another embodiment of apparatus to illustrate use of the method of the present invention in a cased well bore full of fluid. In this form, the decay constant for thermal neutrons in an earth formation is detected and computed in digital form to simplify both up-hole and down-hole circuits to record such information at the earth's surface.

FIG. 4 shows still another form of apparatus to carry out the method of this invention. Here the up-hole and down-hole recording circuits considerably simplify computing decay constants for thermal neutrons in an unknown material. At the same time, the generator irradiates the formation with a burst of fast neutrons, rather than over a more prolonged irradiation cycle as indicated in FIGS. 2a and 2b. FIGS. 5a and 5b will be used to explain the differences in operation of apparatus shown in FIG. 4 as compared to FIG. 1. The main advantage of a burst over a longer cycle is that the generator consumes, on the average, less total power.

FIG. 5a indicates a burst, or pulse, of fast neutron that is of the order of 5 microseconds long. And the period of nonirradiation may be equal to or greater than about 2 milliseconds. Thus, when continuously cycled, the repetition rate is about 500 cycles per second, or less. As seen in FIG. 5b, each burst is short enough so fast-neutron flux and thermal-neutron flux do not attain equilibrium with each other in the test material. For this reason each counting period is started later in the "off" cycle than it would if an elongated pulse, as in FIG. 2a, were used. Also, in this system, different from FIGS. 1 and 3, the gamma-ray counting time periods preferably do not overlap.

In the arrangement of FIG. 4, it will be noted that generator 13 and scintillation detector crystal 20 are placed as close together as possible within sonde 10. At the same time shielding of either the detector from the source, or of the source from secondary radiations generated around the well bore, is omitted intentionally. Such spacing is possible in the present embodiment because a plastic crystal, selected as specified below, does not generate interfering gamma rays from the nuclei of elements that form the crystal. Additionally, by placing the source and detector close together, a less intense source can be used. Further, source 13 itself requires lower power to operate in the borehole. This prolongs its service life, and reduces the load on cable and power accesories that operate it in a well bore. However, where the source and detector are next to each other, it is desirable to use a short time delay between the time the burst ends and the time the first counting period begins. This reduces the number of instantaneously emitted gamma rays generated by fast neutrons acting on steel in casing 54, the walls of sonde 10 itself, formation 14, cement 53 and well fluids 55. A fixed time delay of, say, 200 microseconds is suitable to eliminate these gamma rays.

Delay univibrator 60 applies this fixed time delay in the present embodiment. It is synchronized with the pulsing of source 13 through the timer or "clock" designated as timing oscillator 61. The latter regulates the "on-and-off" time of source 13 through pulse modulator 62. As indicated in the block diagram, "Delay Univibrator" 60 is set to delay counting of gamma rays of predetermined energy from time $t_0$ to time $t_1$. This time interval may be set at any desired value, but as indicated above and in FIG. 5b is 200 microseconds. A similar timer 63, designated as "Univibrator No. 1," is also set for a similar time period of 200 microseconds and, as indicated, this is the time period from $t_1$ to $t_2$. As will be discussed in detail below, this second period may also be to any desired lentgh but in this instance is equal to the delay time period to reduce the amount of equipment that must be operated in the borehole. A similar "Univibrator No. 2" designated as 64 controls the time period from $t_2$ to $t_3$. This time period is also desirably selected to be equal to the previous time periods so that it too is about 200 microseconds in length.

Through lines 65 and 66, univibrators 63 and 64 respectively control scalers 67 and 68, both of which are directly coupled to bias amplifier 28. Bias amplifier 28, together with the amplifying characteristics of photomultiplier tube 23 and crystal 20, select the predetermined minimum energy of thermal-neutron-capture gamma rays that are to be counted in scalers 67 and 68. In the present embodiment as mentioned above, where the source and detector are closely coupled, it is desirable that scintillation crystal 20 be formed of plastic rather than sodium iodide or other crystals containing high-density material. The purpose of this latter restriction is to prevent build-up of radioactivity and the production of thermal-neutron-capture gamma rays of energy greater than 2.2 mev. by the absorption of thermal neutrons in the crystal material itself. Also, photomultiplier tube 23 is connected directly to bias amplifier 28, since this combination of a plastic crystal and high gain in the photomultiplier tube itself replaces a linear amplifier, such as 24 in the embodiment of FIG. 1. It will be remembered that gamma rays interact with such a plastic scintillator only by the Compton effect. In this interaction, the crystal absorbs only a part of the energy of each gamma ray. However, where the bias is set above about 2 mev., the important gamma rays, primarily from chlorine, will be detected often enough statistically so that it is not necessary to absorb completely the gamma rays' energy.

As to the downhole computing equipment, it will be seen in the block diagram that digital scalers 67 and 68 replace rate meters 32 and 33 of FIG. 1. These scalers are suitably set to compute and yield a digital pulse each time 32 pulses are received at the scaler from amplifier 28. It will be recalled that rate meters produce an electrical signal, wattage, or current whose amplitude is proportional, or analogous, to the number of gamma rays received over a fixed time constant. This time constant is set by the RC value of the meter. On the other hand, scalers 67 and 68 do not rely upon such an analog signal, but rather generate an electrical pulse each time it counts a fixed number of gamma rays. And these counts and pulses are entirely independent of time. Hence, it will be seen that the FIG. 4 apparatus computes the ratio of thermal-neutron-capture gamma rays in two different time periods with a digital system rather than by an analog system. Scalers 67 and 68 in the present arrangement are designated as being to the "Scale of 32." Any other digital multiple of 2, for instance a scale of 16, 64, 128, etc., could also be used. However, in the present system for an average neutron flux density of about $10^7$ to $10^9$ neutrons/sec. in bursts of 5 microseconds and over counting periods of about 200 microseconds, this scale of 32 is quite satisfactory to measure the decay constant for all thermal neutrons generating at least the predetermined minimum-value gamma rays in an earth formation.

As suggested above, each thermal-neutron-capture gamma ray at least the prescribed value records on the scaler then coupled to bias amplifier 28. In effect, each time a total of 32 is attained, a pulse is generated, and counting of another sequence of 32 immediately begins. Such counters are called "ring" counters. The advantage of this arrangement is that there is no zero or reset required for the scalers. Thus, each time a total of 32 counts is accumulated in the scaler, a positive or negative pulse is transmitted over cable 12. For example, as shown, scaler 67 may generate a negative going pulse which may be of any arbitrary amplitude and shape so long as the sign of the pulse is recognizable at the earth's surface. To identify which scaler sent each pulse to the earth's surface, scaler 68 generates a positive going pulse of any similarly recognizable characteristic.

In the present embodiment, a scale of 32 yields a suitable number of pulses at the surface so that the computed ratio, representing the absorption coefficient, is averaged over a relatively small distance along the borehole. Under certain conditions, such as when a low-neutron absorption coefficient material is along the well bore, the number of pulses recorded in any one counting cycle may be insufficient to actuate either scaler. However, the successive pulses and equal counting periods will record a sufficient number of pulses in both scalers and at a rate rapid enough to permit an accurate statistical sample of the desired gamma rays.

Time periods established in accordance with the schedule indicated in FIG. 5b can, of course, be considerably varied from that shown. As previously illustrated in the description of the method in connection with FIGS. 2a and 2b likewise, the periods need not be equal in length. All that is required is that two time intervals of known length and of fixed relation to each other be used to permit computation of the thermal-neutron decay curve. The curve of FIG. 5b is the integral or sum of all thermal neutrons, and to determine its slope one needs to know only the value of two points. In the present embodiment, these two values are the sum of all thermal-neutron-capture gamma rays detected in the two adjacent time intervals indicated in FIG. 5b.

To compute the slope of this decay curve, the output of scaler 67 is fed to decimal counter 69 while the output of scaler 68 is fed to a decimal cyclic counter 70. The difference in these two devices is that decimal counter 69 is arranged to continuously count the relatively greater number of pulses that are received during the period $t_1$ to $t_2$ but the output is not transmitted to digital analog converter 71 until such time as decimal cyclic counter 70 receives a fixed number of pulses. In this particular instance, the device is best arranged to read out at the time it receives 100 pulses. The number read out from counter 69 is equal to the ratio $N_1/N_2 \times 100$. As discussed above, this ratio is required for calculating the rate constant $\Sigma_a V$, which is the quantity desired. It will be understood that with a scale of 32 for each output of scaler 68, decimal cyclic counter 70 can be set to read out when it counts two decades. This point represents 3200 counts received during the period from $t_2$ to $t_3$. With this minimum number of counts, for each computation of ratio, the statistical accuracy of the recording system will be better than 2 percent.

As just discussed above, the ratio of the counts in the two intervals not only determines the slope of the curve, but also is directly related to the thermal-neutron absorption coefficient. Hence, the output of the digital-to-analog converter 71 may be recorded by galvanometer 73 as curve 78 on logging chart 72. For the purpose of permitting direct readout without conversion to a logarithmic scale before printout, the absorption rate is desirably recorded on a logarithmic scale rather than upon an arithmetic scale. This type of printout is indicated in FIG. 4. Chart 72 indicates that the absorption rate is expressed in units per milliseconds. Chart 72 displays the depth of logging sonde 10 through direct mechanical drive 73 operated by the position of cable 12.

FIG. 6 is a further embodiment of a surface recording system particularly useful to produce simultaneously a conventional thermal-neutron intensity log. It is intended to operate with a digital detecting and computing arrangement of the type shown in FIG. 4. As in the apparatus shown in FIG. 3, this combined operation permits the operator not only to learn the chlorine content of an earth formation, detected by its thermal-neutron absorption coefficient, but also to find out which formations contain relatively greater amounts of fluid, as indicated by a conventional neutron intensity log.

To use the FIG. 6 circuits, the source and detector must be spaced apart as in the FIG. 1 apparatus. However, in other particulars the down-hole recording and irradiating systems are like those shown in FIG. 4. The main reason for separating source and detector in the present system is so that readout on chart 82 appears in a conventional form. (It would otherwise be reversed in sign for changes in fluid content.) This avoids confusing those operators experienced in using conventional neutron-neutron or neutron-gamma-ray logs. As indicated in FIG. 6, the decimal counter 69, decimal cyclic counter 70, and digital-to-analog converters 71 operate in the same manner as described in FIG. 4. Hence, the output to galvanometer 73 is substantially identical to that indicated in FIG. 4. However, to develop the conventional thermal-neutron intensity log, it is necessary to establish the value, $N_0$, that is, the maximum value of thermal neutrons. This maximum is at the instant fast neutrons are cut off at the end of each burst. This value is essentially the equilibrium, or steady-state, value for thermal-neutron flux generated continuously by a radioactive isotope. It is the same as that used in conventional neutron-neutron or neutron-gamma-ray logs. To establish the value of $N_0$ it is necessary to know (1) the total number of counts during the times (a) $t_1$ to $t_2$ and (b) from $t_2$ to $t_3$, (2) the time required for a fixed number of pulses to be generated in one of those time periods, and (3) the mean time of this period from $t=t_0$. If, for this purpose, the time $t_0$–$t_4$ is selected as indicated in FIG. 5b, then $t_4$ is the mean time from $t_0$ of the counting period $t_2$ to $t_3$. With the sum of counts in period $t_1$ to $t_2$ and $t_2$ to $t_3$ known, the value of $N_0$ is automatically computed. For this purpose, timer 75 measures the time, $t_c$, required for the decimal cyclic counter 70 to go through one cycle period (i.e., 3200 counts in the interval $t_2$ to $t_3$). This measured time allows one to compute the gamma-ray intensity at the time $t_4$ by the relation $N(\text{at } t=t_4)=3200/t_c$. With these three values, $N_1$, $N_2$, and $N(\text{at } t=t_4)$, known, the point of origin of the curve can be computed. This is the function of digital-analog computer 76. Since this output is normally expressed on a curve, such as 79, in arithmetic terms, the galvanometer 76 is given an input signal so that it records in such units.

Figure 7:
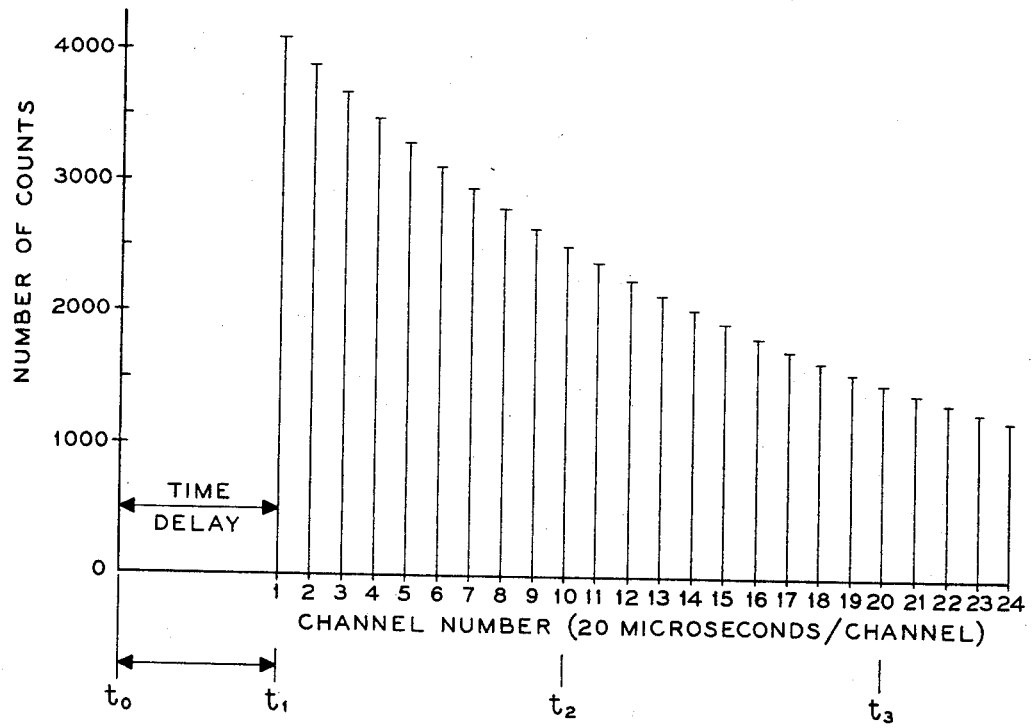
FIG. 7 is a graph of time-versus-thermal-neutron-capture gamma-ray decay rate. It is useful to explain how to calculate the decay rate with gamma-ray spectra recorded on a time analyzer.

From the foregoing description of the examples of apparatus for performing the method of the present invention, it will also be apparent to those skilled in the art that the same information can be derived by using a gamma-ray time analyzer in place of either rate meters 32 and 33, as in FIG. 1, or scalers 67 and 68 in FIG. 4. FIG. 7 represents a time vs. neutron-capture gamma-ray decay curve that will be used in explaining such operation of the method of this invention with a time analyzer.

As indicated above, all that is needed to operate the present method are (1) two time periods of fixed length and known starting times relative to the end of each neutron cycle and (2) a sufficiently fast repetitive rate for the neutron bursts to give an adequate statistical sample of these individual time periods when gamma rays are counted. In conventional gamma-ray recording with a time analyzer, each channel in the analyzer, say 24 as in FIG. 7, is assigned a prescribed time period (e.g., 20 microseconds) for recording gamma rays of a particular energy. With a bias amplifier set to accept all pulses over a predetermined minimum value of 2.4 mev., the present method may be practiced by suitable selection of any two of these 24 pulse channels. Alternatively, any group of two or more channels, such as channels 1 to 10 and channels 11 to 20, are added together. From this essential information, recorded in the prescribed time intervals, the ratio representing thermal-neutron decay rate can be computed from these two gamma-ray counting periods. In this way, the slope of the curve is determined. Hence, the decay constant for an unknown material is measured and recorded as with the apparatus described hereinabove. The gamma-ray time analyzer can be located in the bore hole, but is preferably located at the earth's surface. It supplies the two values, selected as indicated above, to a ratio computer, such as 44 in FIG. 1, to yield a signal that is recorded as the thermal-neutron absorption coefficient.

In addition to the methods shown for measuring the decay rate of the neutron-capture gamma rays generated after neutron irradiation has ceased, various other methods may be used. One other way to record gamma rays during the needed two periods while the neutron source is off is as follows: The output pulses from the gamma-ray detector are applied to the input of a cathode ray tube oscilloscope. This input deflects the cathode ray beam in an amount proportional to the energy of each pulse, which in turn is proportional to gamma-ray energy. The tube face of the oscilloscope is then photographed successively through a grey wedge filter. The photographic exposure is then proportional to the number of gamma rays detected at the oscilloscope. By recording the amount of light transmitted through the photographic negative the total or integral number of gamma rays detected in a given time is measured. From these measured values, one can then plot neutron decay curves with the general shape of those shown in FIGS. 2b and 5b.

From the foregoing description, it will be apparent that the method of the present invention includes the steps of first irradiating an earth formation, such as 14, lying along well bore 11 with a neutron source that may be periodically interrupted. During each interrupted period of neutron irradiation, the thermal-neutron-capture gamma rays from the formation are detected, and the rate of decay of such gamma rays is averaged over many successive periods. This rate of decay is proportional to the neutron-absorption coefficient for the earth formation. The neutron-absorption coefficient is a unique function of the materials present in the formation.

In the preferred manner of carrying out the method, the well bore (including its liquid contents, casing, cement, or drilling fluid) and the surrounding earth formations (fluids included) act both as a fast neutron modifier and as a thermal neutron detector. In this latter sense, thermal neutrons are difficult to detect directly, because (1) they cannot be directed by electromagnetic fields, (2) except statistically their motion is unpredictable, and (3) they can be detected only after they are absorbed by the nucleus of an atom and that nucleus emits decay nucleons, including alpha particles and beta or gamma rays. For these reasons and those discussed earlier, any measurement of neutrons is greatly influenced by materials directly around the source. The present method greatly improves the depth of investigation by eliminating many nuclear products from the measurement. Namely, fast and epithermal neutrons, and their nuclear reaction products produced by hydrogen, oxygen, carbon, and iron in and around the well bore are all eliminated by time discrimination. Thermal neutrons directly absorbed in hydrogen nuclei in and around the well bore are elminated by setting the measuring threshold above 2.2 mev. for gamma rays counted by the detector. Also, thermal neutrons are eliminated by shielding the detector or selecting a detector that is not responsive to them, such as a plastic crystal consisting essentially of hydrocarbons. Finally, only the decay constant of the counting rate for thermal-neutron-capture gamma rays arriving at the detector is measured. This constant is independent of neutron source strength and length of time that the material is irradiated. Hence, it is quite distinct from a simple gamma-ray rate measurement as recorded in conventional neutron-neutron or neutron-gamma-ray logging. The results in turn are expressed in absolute values of absorption distance (cms.) or time (sec.$^{-1}$) rather than counts per time.

Further, these values can be read in terms of chlorinity of waters in an earth formation if the formation is known to contain liquid and the salinity of the water is known. In this way chlorinity will distinguish oil from water behind a casing. A useful example of this is in a producing oil well believed to penetrate cased-off oil-containing formations. Such horizons can be made to produce oil if the casing is perforated at the right location. If the casing is not opened at the correct depth, the producing well can be ruined by water production instead of oil.

In an uncased well bore, a knowledge of rock type (usually known from drilling records) and total fluid content (from a conventional neutron log), in conjunction with measurements of thermal-neutron absorption coefficient by this invention, permits one to measure low values of porosity of earth formations with greater accuracy than previously known.

While only a few embodiments of apparatus to perform the present method have been described and illustrated, others will become apparent to those skilled in the art of well logging from this disclosure. All modifications coming within the scope of my claims are intended to be included.

What is claimed is:

1. A method of identifying the oil-salt water interface in earth formation fluids lying behind a steel casing in a well bore which comprises:
   (a) positioning a source of fast neutrons in said well bore,
   (b) pulsing said source to irradiate said fluids with fast neutrons through said steel casing,
   (c) positioning directly adjacent said fast neutron source a gamma-radiation detector, said detector being substantially insensitive to fast, epithermal, and thermal nutrons,
   (d) detecting only gamma rays having energies above about 2.2 mev. to eliminate thermal-neutron-capture gamma rays from hydrogen in and around said well bore,
   (e) repetitively counting the total number of said gamma rays having energies above 2.2 mev. interacting with said detector during two different periods beginning after the end of each neutron pulse, and
   (f) recording signals representative of said total number of gamma rays detected in said two counting periods as a measure of the rate of decay of thermal neutrons in said earth formation fluids, said rate of decay being substantially faster in said salt water than in said oil and independent of thermal neutron capture by hydrogen nuclei of fluids in said well bore.

2. A method in accordance with claim 1 wherein the two counting periods are of equal length and the length of each period is equal to time from interruption of said source to the start of the first of said counting periods whereby the ratio of the gamma rays during the two counting periods is recorded as an indication of chlorine content of the fluids lying behind a steel casing and the total fluid content is a constant times the time from the interruption of said source to acquire a given number of said gamma rays detected in said periods.

3. A method in accordance with claim 1 in which an electrical pulse is generated in the well bore for a digital multiple of said gamma rays detected in each of said counting periods, transmitting said pulses to the earth's surface and recording an indication of said transmitted pulses in accordance with the depth of said neutron source in said well bore.

4. The method of measuring the thermal-neutron coefficient of absorption $\Sigma_a$ for an unknown material independent of neutron-modifying material directly adjacent the measuring point which comprises:
   (a) positioning a source of monoenergetic fast neutrons adjacent said unknown material,
   (b) pulsing said source to emit said fast neutrons into said material in bursts of about 5 microseconds each and a quiescent period of about 2000 microseconds between bursts,
   (c) positioning a gamma radiation detector adjacent said neutron source and on the same side of said unknown material,
   (d) counting after each burst of neutrons, and a time delay sufficient for all neutrons to become thermalized, the total number $N_1$ of thermal-neutron-capture gamma rays occurring in said detector and having at least a predetermined minimum value representing gamma ray energies greater than 2.2 mev.,
   (e) separately counting the total number $N_2$ of neutron capture gamma rays having said predetermined minimum value during a different time period beginning after the end of each neutron burst,
   (f) recording the logarithm of the ratio $N_1$ to $N_2$ to indicate the thermal-neutron coefficient of absorption for said material in accordance with the formula:

$$\Sigma_a \alpha \ln \frac{N_1}{N_2}$$

and
   (g) separately recording the time from the end of said burst to count a fixed number of said gamma rays as an indication of the initial thermal neutron flux, $N_0$, in said material.

5. Apparatus for measuring simultaneously the relative chlorine and hydrogen content of an earth formation traversed by a well bore which comprises:
   (a) a logging sonde adapted to be supported on a cable in said well bore,
   (b) a fast neutron source positioned in said sonde,
   (c) means for periodically interrupting the emission of fast neutrons from said source for a predeterminable time interval,
   (d) means for positioning a gamma radiation detector at a distance of not more than about 10 inches from said source to detect the thermal-neutron-capture gamma rays returning to said well bore from nuclei in said formation,
   (e) means for discriminating against said gamma rays having energies below about 2.2 mev.,
   (f) means for counting the remaining gamma rays during a first time interval beginning after said neutron source has been interrupted,
   (g) additional means for counting the number of said remaining gamma rays over another time interval beginning later than said first time interval,
   (h) means for computing the ratio of said numbers of gamma rays in said first time interval to the number in said other time interval as a measure of the chlorine content of said formation,
   (i) means for computing from said ratio the terminal number of thermal-neutron-capture gamma rays that were present in said formation at the end of said neutron emission period as a measure of the hydrogen content of said formation, and
   (j) means for recording both the amplitude of said ratio as an indication of the chlorine content of said formation and the amplitude of said terminal number of gamma rays as an indication of the hydrogen content of said formation fluids whereby the chlorine and hydrogen content of said formations are indicated independent of the presence of fluids in said well bore.

6. Apparatus in accordance with claim 5 in which said detector for measuring said gamma rays is spaced about eight inches from said neutron source to minimize variations in said counting rates due to the influence of hydrogen in said formation on the fast neutrons emitted by said source.

7. Apparatus for detecting the levels where salt water and oil contact each other in formations traversed by a well bore and substantially independent of the fluid content or steel casing in said well bore comprising:
   (a) means for supporting a logging sonde on a cable in said well bore,
   (b) a fast neutron source positioned in said logging sonde,
   (c) means for pulsing said source to irradiate oil and salt water in said formation with fast neutrons through the fluids or steel casing between said sonde and said formations,
   (d) means for positioning a scintillation detector directly adjacent said neutron source and substantially without shielding therebetween, said scintillation detector being formed of a material adapted to interact with gamma rays primarily by the Compton scatter process,
   (e) discriminating means connected to said detector for rejecting all gamma rays having energies below about 2.2 mev. to eliminate those gamma rays resulting from thermal-neutron-capture by hydrogen nuclei in fluids in and around said well bore,
   (f) means for repetitively counting the total number of gamma rays passing said discriminator during two different time periods beginning after the end of each pulse of fast neutrons from said source and ending before the start of the next pulse, and (g) means for recording at the earth's surface a signal representative of the total numbers of gamma rays detected in said two counting periods, the ratio of said total numbers being a measure of the rate of decay of thermal neutrons in said oil and salt water, said rate being substantially faster in salt water than in oil and independent of gamma rays captured by iron nuclei in casing or hydrogen nuclei in fluids in said well bore.

8. Apparatus in accordance with claim 7 wherein said means for counting the total number of gamma rays in said two different time periods includes means for initiating one of said time periods a fixed time after the start of the other time period, and means for terminating both of said periods together and before the initiation of the next neutron pulse.

9. Apparatus in accordance with claim 7 in which said two different time periods are selected to be substantially equal in time, the end of the first period being substantially coincident with the start of the second period and the length of said periods being substantially equal to a time period between the end of the fast neutron pulse and the start of the first time period and means for transmitting to the earth's surface electrical pulses representative of a multiple of the pulses counted in said first and second time periods.

10. Apparatus in accordance with claim 7 in which said two time periods are included in a multiplicity of time channels of substantially equal length and each successive channel begins at substantially the end of the previous time channel.

11. Apparatus for determining the hydrogen-chlorine ratio of fluids in and about a well bore, traversing an earth formation, which comprises:
   (a) means for traversing a neutron source through said well bore,
   (b) said neutron source including means for periodically energizing and de-energizing said source to emit fast neutrons,
   (c) a gamma ray detector vertically spaced from said source,
   (d) means for shielding said detector from low-energy gamma radiation of at least a predeterminable minimum value,
   (e) switch means operative in accordance with energization and de-energization of said neutron source to connect said detector to separate energy-sensitive counting means,
   (f) said counting means including:
      (1) means for determining the rate of gamma-ray production above said minimum value during a substantial portion of the fast neutron irradiation of said formation when said source is energized, as a measure of the hydrogen content of said fluids, and
      (2) means for determining the rate of gamma-ray production after said fast neutron source has been interrupted, as a measure of the chlorine content of said fluids, and
   (g) discriminator means between said gamma ray detector and said counting means and operable in response to said switch means for setting the minimum value for detection of gamma rays above that of thermal neutron capture gamma rays from hydrogen nuclei during said rate determination for chlorine and within the gamma rays from hydrogen nuclei during irradiation of said formation,
   (h) means for recording the output of said counting means as a measure of said hydrogen-chlorine ratio, said recording being in accordance with the depth of said detector in said well bore.

References Cited

UNITED STATES PATENTS

| Re. 24,383 | 10/1957 | McKay | 250—71.5 |
| 3,102,956 | 9/1963 | Armistead. | |
| 3,184,598 | 5/1965 | Tittle. | |
| 3,256,438 | 6/1966 | Armistead. | |
| 3,379,884 | 4/1968 | Youmans | 250—83.3 |

ARCHIE R. BORCHELT, Primary Examiner

U.S. Cl. X.R.

250—83.3, 83.6